United States Patent
Westerkamp

(10) Patent No.: US 12,246,571 B2
(45) Date of Patent: Mar. 11, 2025

(54) VALVE ARRANGEMENT OF AN AIR SUSPENSION SYSTEM OF A VEHICLE AND METHOD FOR CONTROLLING SUCH AN AIR SUSPENSION SYSTEM

(71) Applicant: ZF CV Systems Europe BV, Brussels (BE)

(72) Inventor: Helge Westerkamp, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/502,819

(22) Filed: Nov. 6, 2023

(65) Prior Publication Data

US 2024/0190199 A1    Jun. 13, 2024

(30) Foreign Application Priority Data

Dec. 7, 2022  (DE) ...................... 10 2022 132 484.2

(51) Int. Cl.
*B60G 17/052*    (2006.01)

(52) U.S. Cl.
CPC .... *B60G 17/0528* (2013.01); *B60G 2202/152* (2013.01); *B60G 2202/412* (2013.01); *B60G 2202/42* (2013.01); *B60G 2400/252* (2013.01); *B60G 2400/50* (2013.01)

(58) Field of Classification Search
CPC .......... B60G 17/0528; B60G 2202/152; B60G 2202/412; B60G 2202/42; B60G 2400/252; B60G 2400/50; B60G 17/056; B60G 2500/2012; B60G 2500/2021; B60G 2500/203; B60G 2500/204; B60G 2600/26; B60G 2600/66; B60G 17/0523
See application file for complete search history.

(56) References Cited

U.S. PATENT DOCUMENTS

| | | |
|---|---|---|
| 2008/0272562 A1 | 11/2008 | Sabelstrom et al. |
| 2020/0290425 A1 | 9/2020 | Harting et al. |

FOREIGN PATENT DOCUMENTS

| | | | |
|---|---|---|---|
| DE | 195 46 730 A1 | 6/1997 | |
| DE | 103 50 731 A1 | 5/2005 | |
| DE | 10 2012 006 468 A1 | 10/2013 | |
| DE | 10 2017 222 278 A1 | 6/2019 | |
| DE | 10 2019 119 335 A1 | 1/2021 | |
| DE | 102019219880 A1 * | 6/2021 | ............. B60G 11/27 |
| DE | 11 2013 001 525 B4 | 7/2021 | |

(Continued)

*Primary Examiner* — Drew J Brown
(74) *Attorney, Agent, or Firm* — Walter Ottesen, P.A.

(57) ABSTRACT

A valve arrangement of a vehicle's air suspension system has a pressure generator with a two-stage compressor drivable by an electric motor, an air dryer, and a switchover valve. A main line is connected to the pressure generator and branches into at least two first axle lines. Two bellows lines per vehicle axle each branch off from one of the first axle lines and lead via a shutoff valve to an air bellows. The pressure generator has a second connection connected to a delivery line of the pressure generator between two compressor stages of the compressor. A second main line is connected to the second connection. The second main line branches into at least two second axle lines downstream of a shutoff valve. These second axle lines are each connected to one of the branching points of the first axle lines at the axles, each via one shutoff valve.

12 Claims, 7 Drawing Sheets

(56) References Cited

FOREIGN PATENT DOCUMENTS

| | | | | |
|---|---|---|---|---|
| DE | 102021201458 B3 | * | 10/2021 | ............ B01D 53/261 |
| DE | 102021210478 A1 | * | 3/2023 | ......... B60G 17/0182 |
| EP | 3619066 B1 | * | 8/2023 | ......... B60G 17/0155 |

* cited by examiner

VALVE ARRANGEMENT OF AN AIR SUSPENSION SYSTEM OF A VEHICLE AND METHOD FOR CONTROLLING SUCH AN AIR SUSPENSION SYSTEM

CROSS-REFERENCE TO RELATED APPLICATIONS

This application claims priority of German patent application no. 10 2022 132 484.2, filed Dec. 7, 2022, the entire content of which is incorporated herein by reference.

TECHNICAL FIELD

The disclosure relates to a valve arrangement of an air suspension system of a vehicle, having a pressure generator or generation unit, which has a two-stage compressor drivable by an electric motor, an air dryer, a switchover valve for switching between a delivery operation and a regeneration operation, a working connection and an environment connection. Moreover, a main working line is present, which is connected to the working connection of the pressure generation unit and branches into at least two first axle working lines. Moreover, two bellows lines per vehicle axle are present, which each branch off from one of the first axle working lines and lead via a shutoff valve to an associated air bellows of the relevant vehicle axle. The disclosure also relates to a method for controlling such an air suspension system.

BACKGROUND

It is generally known that the vehicle body of an air-suspended vehicle can be lowered by venting its air bellows and raised by supplying air to the air bellows, as required. During fast driving on the freeway or on an expressway, the air resistance of the vehicle is decreased and the fuel consumption of the vehicle is reduced by lowering the vehicle body. During driving on unpaved roads and off road, contact with ground obstacles such as rocks, branches and mounds of earth can be avoided and damage to the vehicle frame or vehicle floor of the vehicle can be prevented by raising the vehicle body. In air-suspended city buses, it is also usual to lower the vehicle body on the door side at bus stops in order to allow passengers to board and alight largely without impediments.

DE 103 50 731 A1 describes a tilting device of a vehicle, which is preferably in the form of a pickup truck, having two air-suspended vehicle axles and a method for operating such a tilting device. To make it easier to load and unload the load bed of the vehicle, air is supplied to or vented from the air bellows at the front axle and the rear axle individually or in groups via an electronic controller such that the vehicle is tilted about a longitudinal axis, a transverse axis, or a geometric axis offset by a certain angle from the longitudinal axis or transverse axis.

US 2008/0272562 A1 and DE 11 2013 001 525 B4 each disclose a controller of an air-suspended truck with which, by corresponding supply of air to or venting of air from the air bellows, the load bed of the truck can be set horizontally when the ground slopes longitudinally and/or transversely, for example in front of a loading ramp to prevent the load from slipping.

However, the cited documents do not contain any information relating to the specific configuration of the valve arrangements of the respective air suspension systems with which the tilting functions or vehicle orientations are supposed to be possible.

A valve arrangement of a level-regulating device of an air-suspended vehicle axle known from DE 195 46 730 A1 has, according to FIG. 1 of the document, an axle switchover valve in the form of a 3/2-way magnetic switching valve, via which a pneumatic axle working line can be connected either to a compressed air source or to a compressed air sink. The axle working line branches into two bellows lines, which each lead to the associated air bellows of the vehicle axle via a shutoff valve in the form of a 2/2-way magnetic switching valve. In a vehicle having two air-suspended vehicle axles and one such valve arrangement per vehicle axle, the vehicle body of the vehicle can be tilted relatively quickly about a transverse axis of the vehicle by venting the air bellows of one vehicle axle and at the same time supplying air to the air bellows of the other vehicle axle.

In a valve arrangement of a level-regulating device of an air-suspended vehicle known from DE 10 2012 006 468 A1, according to FIG. 3 of the document, the bellows lines each leading via a shutoff valve in the form of a 2/2-way magnetic switching valve to the air bellows are connected to one side working line per vehicle side. The side working lines can each be connected via a side switchover valve in the form of a 3/2-way magnetic switching valve either to a compressed air source or to a venting line that leads into the environment via a muffler. The vehicle body of the vehicle can be tilted relatively quickly about a longitudinal axis of the vehicle with this valve arrangement, by venting the air bellows of one vehicle side and at the same time supplying air to the air bellows of the other vehicle side.

However, 3/2-way magnetic switching valves are relatively expensive and susceptible to faults, and therefore they are often not used, and 2/2-way magnetic switching valves are preferably used instead. Therefore, DE 10 2019 119 335 A1 discloses, in FIGS. 2 and 4 of the document, valve arrangements of an air-suspended vehicle in which in each case air can be either supplied to or vented from a main working line via a pressure generation unit. The pressure generation unit includes a two-stage compressor drivable by an electric motor, an air dryer, a switchover valve for switching between a delivery operation and a regeneration operation, a working connection and an environment connection. The switchover valve is in the form of a pressure-controlled 4/2-way switching valve to which a 3/2-way magnetic switching valve is assigned as a pilot valve. Via the pilot valve, the control input of the switchover valve can be connected either to the environment connection or to the working connection. When the switchover valve is in the non-switched state and the compressor is switched on, air is sucked from the environment via the environment connection, compressed, dried in the air dryer, and conveyed via a throttle valve to the working connection. When the switchover valve is in the switched state and the compressor is switched off, compressed air flows via the working connection and the throttle valve counter to the conveying direction through the air dryer and via a bypass line and the environment connection into the environment.

The main working line is connected to the working connection of the pressure generation unit and branches into two axle working lines, from each of which two bellows lines branch off and lead via a shutoff valve to an associated air bellows of the relevant vehicle axle. Since air is supplied to and vented from the air bellows of both vehicle axles only via the pressure generation unit with this valve arrangement, the venting of the air bellows of one vehicle axle and the supply of air to the air bellows of the other vehicle axle can only take place successively, as a result of which the vehicle body of the vehicle can be tilted about a transverse axis of the vehicle only relatively slowly.

SUMMARY

It is an object of the disclosure to provide a valve arrangement of an air suspension system of a vehicle such that tilting of the vehicle body about its transverse axis is possible more quickly than previously.

The aforementioned object is, for example, achieved by a valve arrangement of an air suspension system of a vehicle having vehicle axles. The valve arrangement includes: a pressure generator having a two-stage compressor, an air dryer, a switchover valve for switching between a delivery operation and a regeneration operation; the compressor being configured to be driven by an electric motor; the pressure generator further having a working connection and an environment connection; a first main working line connected to the working connection of the pressure generator and branching into at least two first axle working lines; two bellows lines per vehicle axle, which each branch off from one of the at least two first axle working lines and lead via a first shutoff valve to an associated air bellows of a corresponding vehicle axle; the pressure generator having a second working connection connected to a delivery line of the pressure generator between two compressor stages of the compressor; a second main working line connected to the second working connection of the pressure generator; a second shutoff valve arranged in the second main working line; the second main working line branching into at least two second axle working lines downstream of the second shutoff valve; each of the at least two second axle working lines being connected to one of at least two branching points of the at least two first axle working lines at the vehicle axles via a corresponding third shutoff valve; each of the at least two first axle working lines having a fourth shutoff valve arranged therein; and, the second shutoff valve, the third shutoff valves, and the fourth shutoff valves being 2/2-way magnetic switching valves configured to be closed when in a non-energized state.

It is a further object of the disclosure to provide a method for controlling an air suspension system as disclosed herein.

The aforementioned object is, for example, achieved by a method for controlling an air suspension system of a vehicle having a vehicle body and a valve arrangement as described above. The method, in order to tilt a vehicle body rapidly about a transverse axis of the vehicle, includes simultaneously:

switching on the compressor and opening the second shutoff valve arranged in the second main working line;
opening the first and the third shutoff valves arranged in the at least two second axle working lines and in the two bellows lines at the vehicle axle at which the vehicle body is to be lowered; and,
opening the first and the fourth shutoff valves that are arranged in a first of said at least two first axle working lines and in the two bellows lines at the vehicle axle at which the vehicle body is to be raised.

Accordingly, the disclosure relates to a valve arrangement of an air suspension system of a vehicle, having a pressure generation unit, which has a two-stage compressor drivable by an electric motor, an air dryer, a switchover valve for switching between a delivery operation and a regeneration operation, a working connection and an environment connection, and having a main working line, which is connected to the working connection of the pressure generation unit and branches into at least two first axle working lines, and having two bellows lines per vehicle axle, which each branch off from one of the first axle working lines and lead via a shutoff valve to an associated air bellows of the relevant vehicle axle.

To achieve the object relating to the device, it is provided in this valve arrangement for the pressure generation unit to have a second working connection, which is connected to a delivery line of the pressure generation unit between two compressor stages of the compressor, for a second main working line to be present, which is connected to the second working connection of the pressure generation unit, for a shutoff valve to be arranged in the second main working line, for the second main working line to branch into at least two second axle working lines downstream of the shutoff valve, for the second axle working lines to be connected to in each case one of the branching points of the first axle working lines at the vehicle axles via in each case one shutoff valve, for a shutoff valve to be arranged in each of the first axle working lines, and for the shutoff valves in the second main working line, in the first axle working lines and in the second axle working lines to be in the form of 2/2-way magnetic switching valves that are closed when in the non-energized state.

With this valve arrangement, it is possible to vent the air bellows of one vehicle axle via the associated second axle working line and the second main working line when the compressor is switched on in a booster operation and at the same time to supply air to the air bellows of the other vehicle axle via the first main working line and the associated first axle working line, as a result of which rapid tilting of the vehicle body about a transverse axis of the vehicle is effected. This booster operation is also very efficient and energy-saving, because the compressed air of the air bellows to be vented is not released into the environment, as is otherwise usual.

It is self-evident with knowledge of the disclosure itself that the venting of the air bellows of one vehicle axle can take place only up to the medium pressure that is set in the delivery line between the two compressor stages of the compressor when the compressor is running. When the air bellows to be vented are to be vented under this pressure, it is necessary correspondingly to switch over shutoff valves, switch off the compressor, and switch over the switchover valve into regeneration operation of the pressure generation unit.

According to an embodiment of the valve arrangement, in order to be able to carry out regeneration of the air dryer of the pressure generation unit independently of a venting of air bellows or to carry out supply of air to air bellows of at least one vehicle axle independently of an operation of the compressor, a compressed air reservoir is connected via a shutoff valve to the first main working line or one of the first axle working lines. The shutoff valve is preferably in the form of a 2/2-way magnetic switching valve that is closed in the non-energized state. The compressed air reservoir can thus be filled by a delivery operation of the pressure generation unit when the shutoff valve is open outside of when air is supplied to or vented from air bellows, and the compressed air stored in the compressed air reservoir is available when the shutoff valve is closed either for regeneration of the drying means of the air dryer or for supplying air to air bellows.

According to another embodiment of the valve device, alternatively or additionally to the first compressed air reservoir, a further compressed air reservoir can be arranged, which is connected to the second main working line or one of the second axle working lines. This compressed air reservoir can also be filled by a delivery operation of the pressure generation unit when the shutoff valves of the relevant axle working lines are open outside of when air is supplied to or vented from air bellows, and the compressed air stored in the compressed air reservoir can be used either for regeneration of the air dryer or for supplying air to air bellows.

In an alternative embodiment of the valve device to this, it is provided for a compressed air reservoir to be connected to each of the second axle working lines close to the respective vehicle axle alternatively or additionally to the first compressed air reservoir.

The method processes for controlling the valve arrangement are dependent on the specific embodiment of the respective valve arrangement. With a valve arrangement according to some embodiments, the object relating to the method is achieved in that the following method steps are carried out simultaneously in order to tilt a vehicle body rapidly about a transverse axis of the vehicle:
 a) switching on the compressor and opening the shutoff valve arranged in the second main working line,
 b) opening the shutoff valves that are arranged in the second axle working line and in the bellows lines at the vehicle axle at which the vehicle body is to be lowered,
 c) opening the shutoff valves that are arranged in the first axle working line and in the bellows lines at the vehicle axle at which the vehicle body is to be raised.

Since, during this tilting function, the compressed air does not escape into the environment from the air bellows to be vented but is fed via the pressure generation unit to the air bellows to which air is to be supplied, this tilting function is particularly effective and energy-saving.

In a basic embodiment of the valve arrangement, when the shutoff valves of the second main working line, of the first and second axle working lines and of the bellows lines are closed, the following method steps are carried out to charge the compressed air reservoir:
 a) switching on the compressor and opening the shutoff valve associated with the compressed air reservoir,
 b) monitoring a filling pressure of the compressed air reservoir via a pressure sensor connected to the first main working line or to one of the first axle working lines,
 c) switching off the compressor and closing the shutoff valve associated with the compressed air reservoir when the intended filling pressure of the compressed air reservoir is reached.

In a basic embodiment of the valve arrangement, when the shutoff valves of the second main working line, of the first and second axle working lines and of the bellows lines are closed, the following method steps are carried out to regenerate the air dryer with compressed air from the compressed air reservoir:
 a) switching over the switchover valve and opening the shutoff valve associated with the compressed air reservoir,
 b) monitoring a regeneration duration of the air dryer via a clock or the filling pressure of the compressed air reservoir via the shutoff valve associated with the compressed air reservoir,
 c) switching back the switchover valve and closing the shutoff valve of the compressed air reservoir when the intended regeneration duration or the intended filling pressure of the compressed air reservoir is reached.

In a basic embodiment of the valve arrangement, the following method steps are carried out to raise the vehicle body at least at one vehicle axle using compressed air from the compressed air reservoir:
 a) opening the shutoff valve associated with the compressed air reservoir,
 b) opening the shutoff valves of the first axle working line and of the bellows lines at the relevant vehicle axle,
 c) monitoring the wheelbase or ground clearance of the vehicle body at the relevant vehicle axle via a height sensor,
 d) closing the shutoff valves when the intended wheelbase or ground clearance of the vehicle body at the relevant vehicle axle is reached.

With regard to the two embodiments of the valve arrangement according to further embodiments, the object relating to the method is achieved in that the following method steps are carried out simultaneously in order to tilt the vehicle body rapidly about a transverse axis:
 a) switching over the switchover valve into its regeneration switching position,
 b) opening the shutoff valves of the first axle working line and of the bellows lines at the vehicle axle at which the vehicle body is to be lowered,
 c) opening the shutoff valves of the second axle working line and of the bellows lines at the vehicle axle at which the vehicle body is to be raised.

In the developed embodiments of the valve arrangement, when the shutoff valves of the second main working line and of the bellows lines are closed, the following method steps are carried out to charge the at least one compressed air reservoir:
 a) switching on the compressor and opening the shutoff valves of the first axle working line and of the second axle working line at least at one of the vehicle axles,
 b) monitoring a filling pressure of the compressed air reservoir via the pressure sensor connected to the first main working line or one of the first axle working lines,
 c) switching off the compressor and closing the shutoff valves of the first and second axle working lines when the intended filling pressure of the compressed air reservoir is reached.

In the developed embodiments of the valve arrangement, when the shutoff valves of the second main working line and of the bellows lines are closed, the following method steps are carried out to regenerate the air dryer with compressed air from the at least one compressed air reservoir:
 a) switching over the switchover valve and opening the shutoff valves of the first and second axle working lines at least at one of the vehicle axles,
 b) monitoring a regeneration duration of the air dryer via a clock or the filling pressure of the compressed air reservoir via the pressure sensor,
 c) switching back the switchover valve and closing the shutoff valves of the first and second axle working lines when the intended regeneration duration or the intended filling pressure of the compressed air reservoir is reached.

In the developed embodiments of the valve arrangement, the following method steps are carried out to raise the vehicle body at least at one vehicle axle using compressed air from the at least one compressed air reservoir:
 a) opening the shutoff valves of the second axle working line and of the bellows lines at the relevant vehicle axle,
 b) monitoring the wheelbase or ground clearance of the vehicle body at the relevant vehicle axle via a height sensor, c) closing the shutoff valves when the intended wheelbase or ground clearance of the vehicle body at the relevant vehicle axle is reached.

BRIEF DESCRIPTION OF DRAWINGS

The invention will now be described with reference to the drawings wherein.

DETAILED DESCRIPTION

Figure 2:
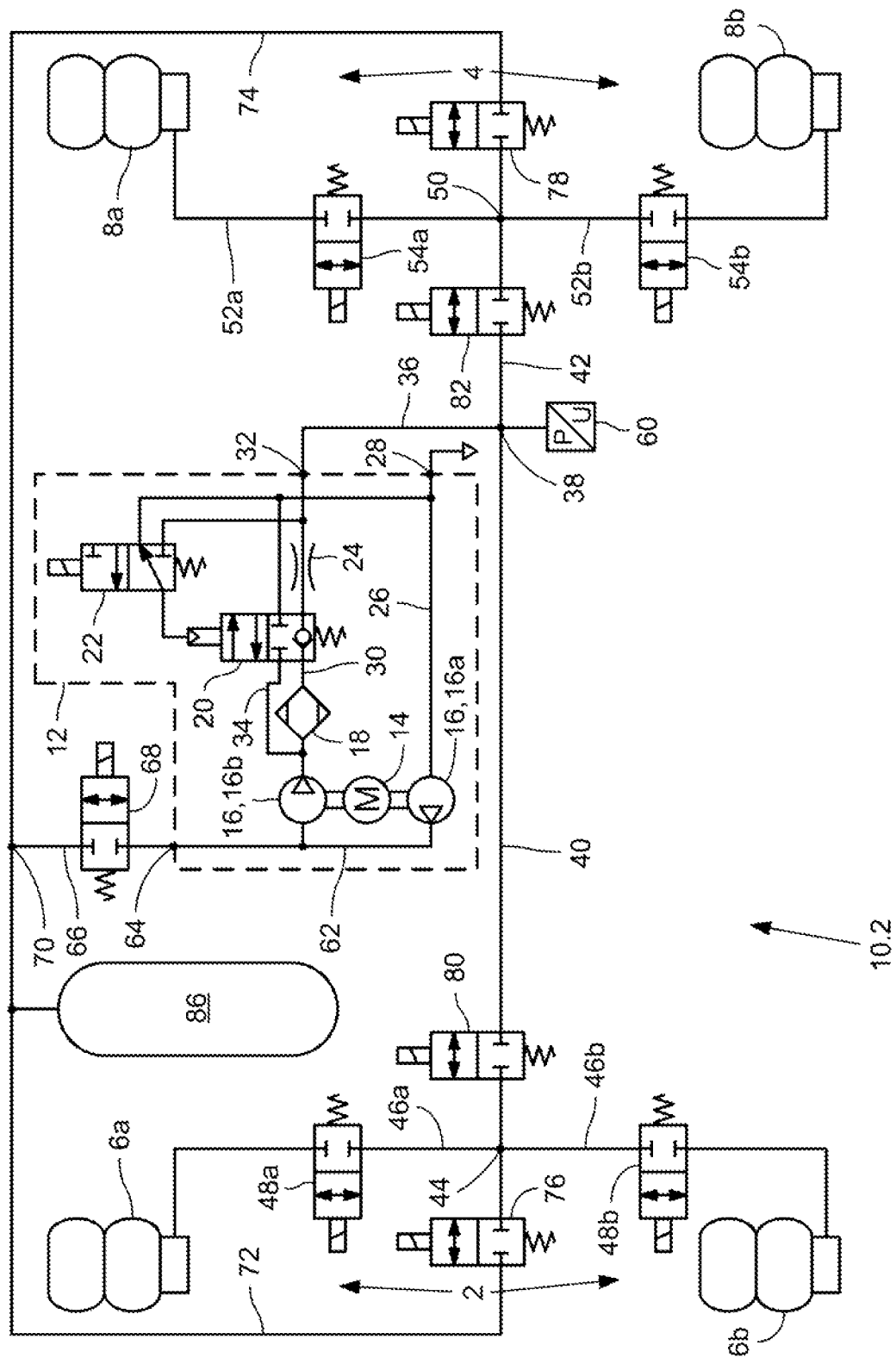
FIG. 2 shows an embodiment of the valve arrangement according to FIG. 1 in a schematic diagram.
Figure 4:
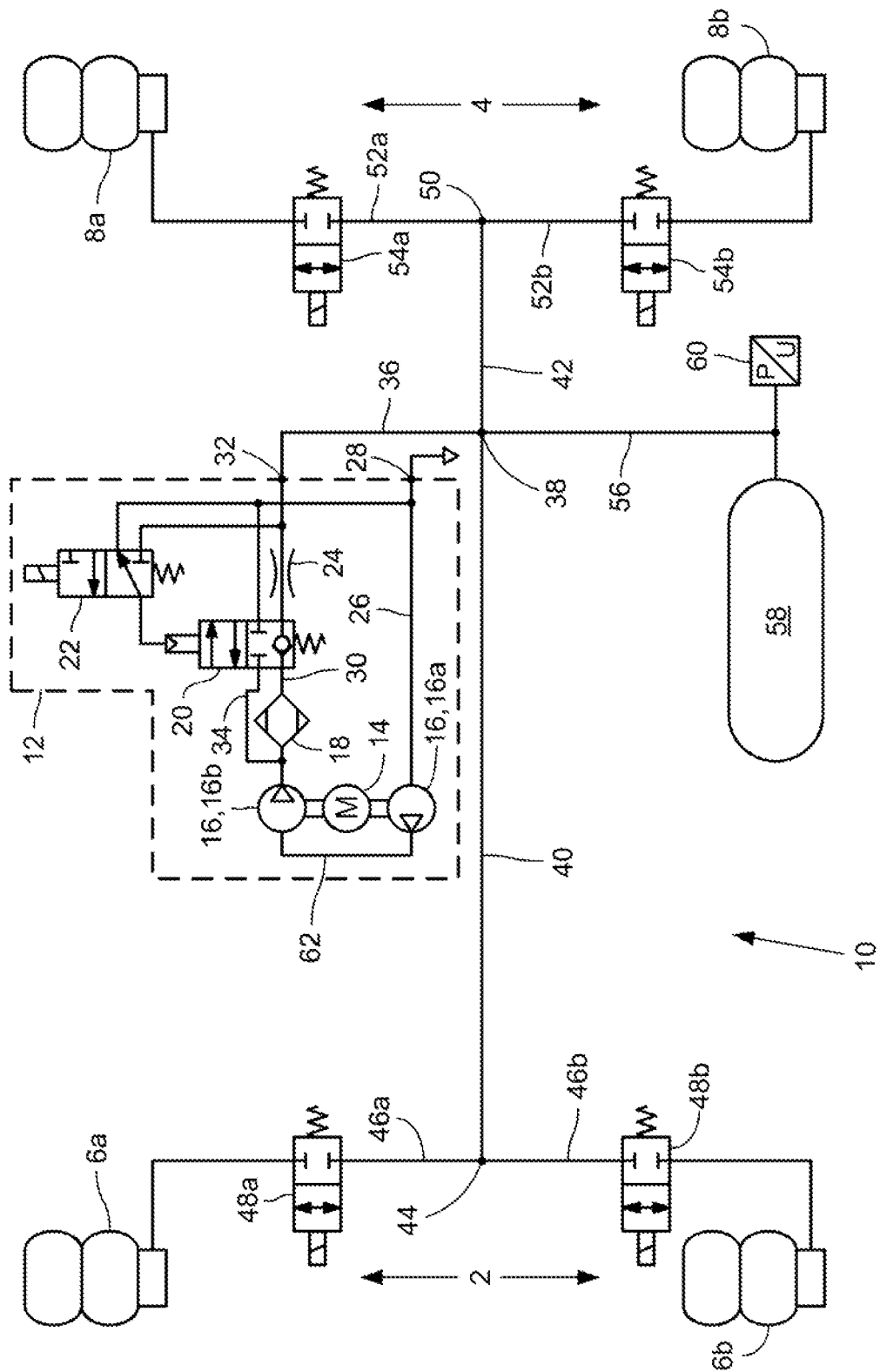

The schematic diagram of FIG. 4 shows a known valve arrangement 10 of an air suspension system of a two-axle vehicle corresponding to that of DE 10 2019 119 335 A1, according to FIGS. 2 and 4 of the document, without the pressure adjustment device provided in the document.

The air suspension system has in each case two air bellows 6a, 6b; 8a, 8b, which are arranged laterally on the front axle 2 and on the rear axle 4 of the vehicle. The valve arrangement 10 has a pressure generator or generation unit 12, which includes a two-stage compressor 16, drivable by an electric motor 14 and having a first compressor stage 16a and a second compressor stage 16b, an air dryer 18, a pressure-controlled switchover valve 20 with an associated pilot valve 22, and a throttle valve 24. An outlet line 26 is connected to the input side of the first compressor stage 16a and leads via an environment connection 28 of the pressure generation unit 12 into the vehicle environment. The pneumatic input of the second compressor stage 16b is connected to the pneumatic output of the first compressor stage 16a. A delivery line 30 is connected to the output side of the second compressor stage 16b and leads via the air dryer 18, the switchover valve 20 and the throttle valve 24 to a working connection 32 of the pressure generation unit 12.

The switchover valve 20 is in the form of a pressure-controlled 4/2-way switching valve, which is used to switch the pressure generation unit 12 between a delivery operation and a regeneration operation. The associated pilot valve 22 is in the form of a 3/2-way magnetic switching valve, via which the control input of the switchover valve 20 can be connected either to the outlet line 26 or to the delivery line 30. When the pilot valve 22 is in the non-energized state, the control input of the switchover valve 20 is connected to the outlet line 26 and is thus depressurized, as shown in FIG. 4. As a result, the pressure generation unit 12 is in delivery operation, in which compressed air compressed when the compressor 16 is switched on is conveyed to the working connection 32. When the pilot valve 22 is in the energized state, the control input of the switchover valve 20 is connected to the output-side section of the delivery line 30 and is thus pressurized. As a result, the pressure generation unit 12 is in regeneration operation, in which compressed air flows from the working connection 32 via the delivery line 30 counter to the delivery direction via the throttle valve 24, the switchover valve 20, with absorption of moisture by the air dryer 18, and further via a bypass line 34, the outlet line 26 and the environment connection 28 into the environment.

A main working line 36 is connected to the working connection 32 and branches into two axle working lines 40, 42 at a first branching point 38. The first axle working line 40 leads to the front axle 2 and branches there at a second branching point 44 into two front bellows lines 46a, 46b, which are each connected to one of the air bellows 6a, 6b of the front axle 2 via a shutoff valve 48a, 48b in the form of a 2/2-way magnetic switching valve. The second axle working line 42 leads to the rear axle 4 and branches there at a third branching point 50 into two rear bellows lines 52a, 52b, which are each connected to one of the air bellows 8a, 8b of the rear axle 4 via a shutoff valve 54a, 54b in the form of a 2/2-way magnetic switching valve. The shutoff valves 48a, 48b; 54a, 54b are closed when in the non-energized state, as shown, and open when in the energized state. A compressed air reservoir 58 and a pressure sensor 60 are also connected to the first branching point 38 of the main working line 36 via a connection line 56.

In an air suspension system having such a known valve arrangement 10, air can be supplied to the air bellows 6a, 6b; 8a, 8b either by delivery operation of the pressure generation unit 12 or from the compressed air reservoir 58, by opening the relevant shutoff valves 48a, 48b; 54a, 54b. However, the air bellows 6a, 6b; 8a, 8b can be vented only by regeneration operation of the pressure generation unit 12, wherein the relevant shutoff valves 48a, 48b; 54a, 54b are opened. Simultaneously supplying air to the air bellows (6a, 6b or 8a, 8b) of one vehicle axle (2 or 4) and venting the air bellows (8a, 8b or 6a, 6b) of the other vehicle axle (4 or 2), with which rapid tilting of the vehicle body about a transverse axis of the vehicle can be effected, is not possible with this known valve arrangement 10. Pressure equalization between the air bellows 6a, 6b; 8a, 8b is possible by opening the relevant shutoff valves 48a, 48b; 54a, 54b both between the air bellows of one vehicle axle (2 or 4) and between the air bellows of both vehicle axles 2, 4. The compressed air reservoir 58 can be filled either by delivery operation of the pressure generation unit 12 or from at least one of the air bellows 48a, 48b; 54a, 54b, wherein the filling pressure of the compressed air reservoir 58 is measured via the pressure sensor 60.

Figure 1:
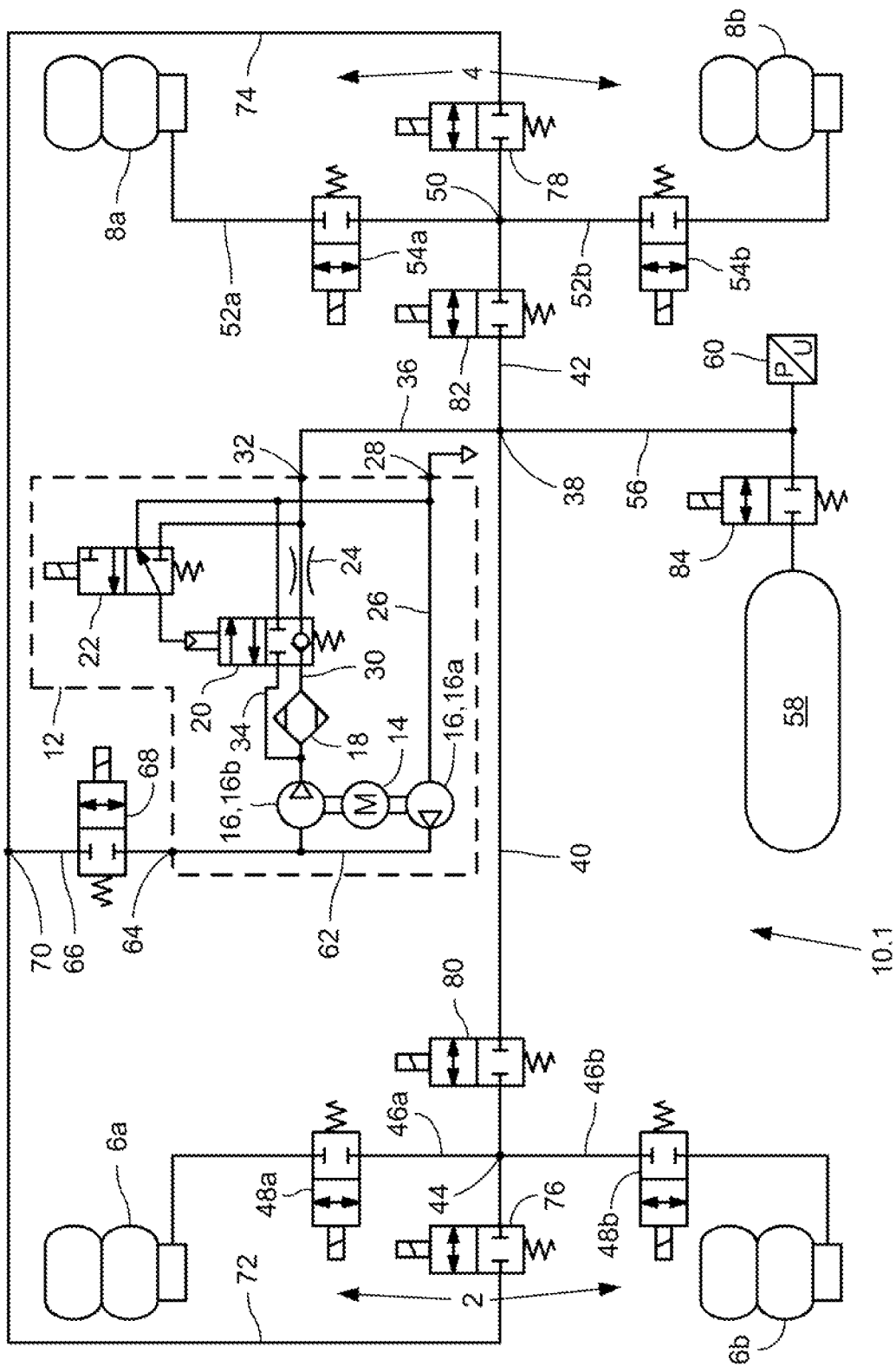
FIG. 1 shows a valve arrangement according to the disclosure of an air suspension system of a vehicle in a schematic diagram.

The schematic diagram of FIG. 1 shows a valve arrangement 10.1 according to the disclosure of an air suspension system of a two-axle vehicle, which differs from the known valve arrangement 10 according to FIG. 4 by the following features:

a second working connection 64 of the pressure generation unit 12, which working connection is connected to the delivery line 62 there between the two compressor stages 16a, 16b of the compressor 16, a second main working line 66, which is provided with a shutoff valve 68 and is connected to the second working connection 64 of the pressure generation unit 12, two second axle working lines 72, 74, which branch off from the second main working line 66 at a fourth branching point 70 and lead to the vehicle axles 2, 4 via in each case one shutoff valve 76, 78 at in each case one of the branching points 44, 50 of the axle working lines 40, 42, in each case one shutoff valve 80, 82 in the axle working lines 40, 42, and a shutoff valve 84 between the connection line 56 and the compressed air reservoir 58.

The additional shutoff valves 68, 76, 78, 80, 82, 84 just mentioned are in the form of 2/2-way magnetic switching valves, which are closed in the non-energized state and open in the energized state.

Figure 1A:
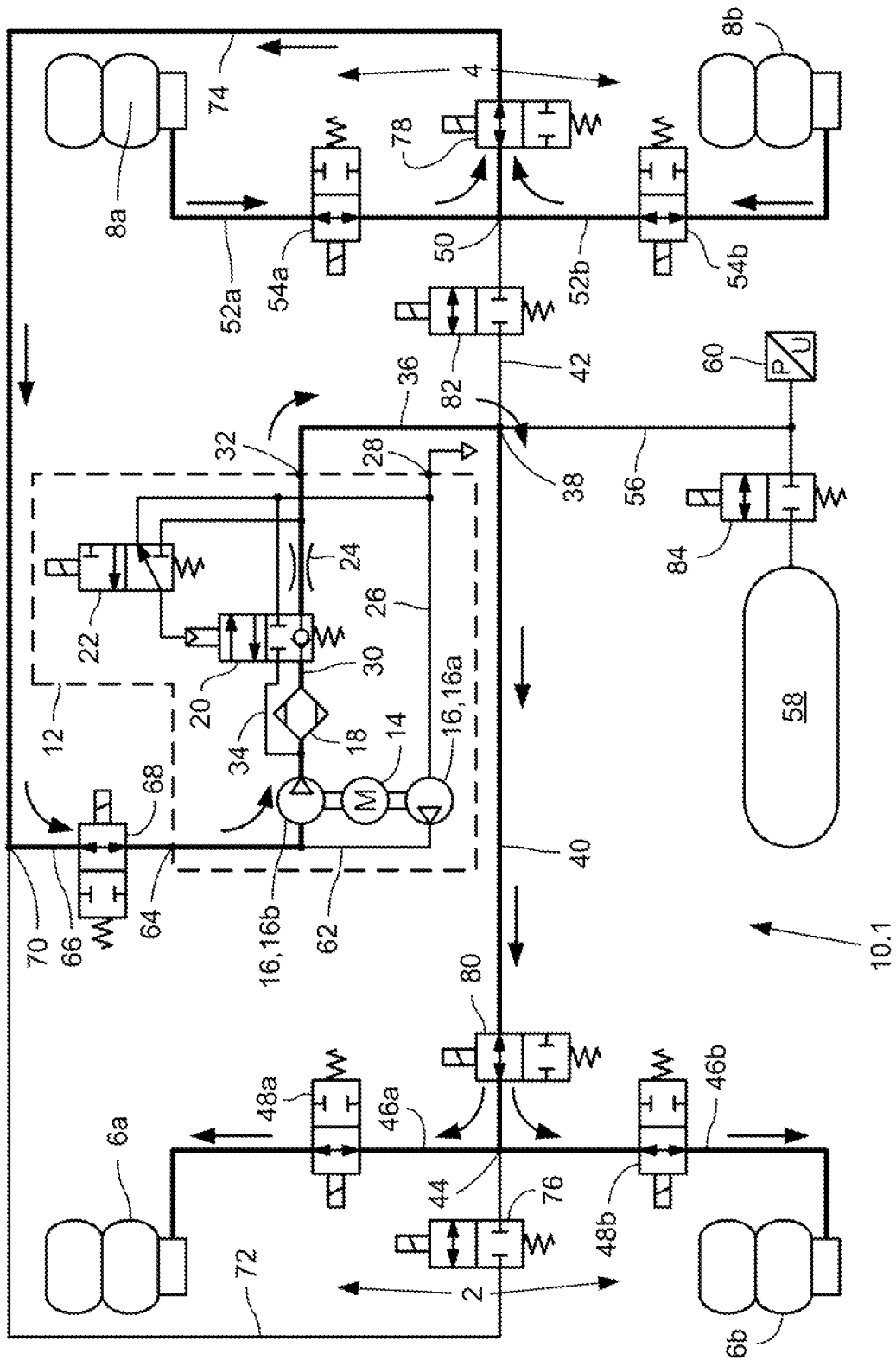
FIG. 1A shows a functional circuit of the valve arrangement according to FIG. 1 for a tilting function of the air suspension system in a schematic diagram.

FIG. 1A shows a functional circuit of the valve arrangement 10.1 according to FIG. 1 for a tilting function in which the vehicle body is tilted to the rear about a transverse axis of the vehicle by venting the air bellows 8a, 8b of the rear axle 4 and supplying air to the bellows 6a, 6b of the front axle 2. To this end, the switched valves are shown shifted according to their switching state, the lines through which compressed air flows are shown with a thicker line, and the flow direction of the compressed air is indicated with direction arrows.

In this switching position of the valve arrangement 10.1, the compressor 16 is switched on and the shutoff valve 68 in the second main working line 66 is open. Therefore, compressed air is sucked out of the air bellows 8a, 8b of the rear axle 4 with open shutoff valves 54a, 54b, 78 via the bellows lines 52a, 52b, the second axle working line 74 and the second main working line 66 and conveyed via the delivery line 30 of the pressure generation unit 12 to the first working connection 32. From there, the compressed air flows with open shutoff valves 48a, 48b, 80 via the first main working line 36, the first axle working line 40 and the bellows lines 46a, 46b into the air bellows 6a, 6b of the front axle 2. The simultaneous venting of the air bellows 8a, 8b of the rear axle 4 and supply of air to the air bellows 6a, 6b of the front axle 2 results in rapid lowering of the vehicle body to the rear about the transverse axis. This tilting function is also particularly effective and energy-saving, since compressed air does not escape into the environment from the air bellows 8a, 8b to be vented but is used to fill the air bellows 6a, 6b of the front axle 2.

The schematic diagram of FIG. 2 shows an embodiment, labeled 10.2, of the valve arrangement 10.1 according to the disclosure of an air suspension system of a two-axle vehicle according to FIG. 1, in which a compressed air reservoir 86 is connected to the second axle working line 72 of the front axle 2, instead of the compressed air reservoir 58 connected to the first main working line 36 via the connection line 56 and the shutoff valve 84.

Figure 2A:
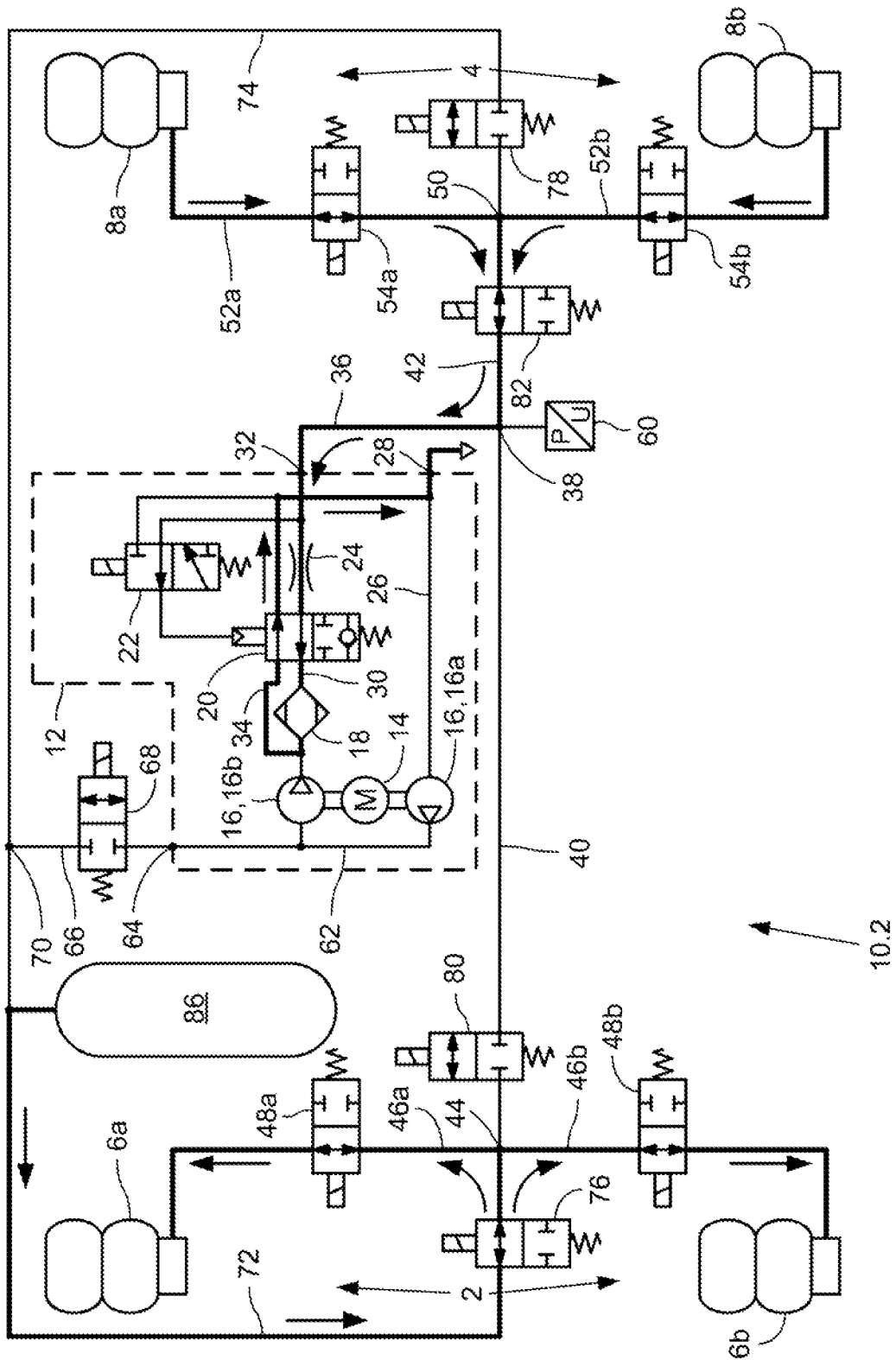
FIG. 2A shows a functional circuit of the valve arrangement according to FIG. 2 for a tilting function of the air suspension system in a schematic diagram.

FIG. 2A illustrates a functional circuit of the valve arrangement 10.2 according to FIG. 2 for a tilting function in which the vehicle body is tilted to the rear about a transverse axis of the vehicle by venting the air bellows 8a, 8b at the rear axle 4 and supplying air to the bellows 6a, 6b at the front axle 2. To this end, the switched valves are shown shifted according to their switching state, the lines through which compressed air flows are shown with a thicker line, and the flow direction of the compressed air is indicated with direction arrows.

In this switching position of the valve arrangement 10.2, the compressor 16 is switched off and the pressure generation unit 12 is switched into regeneration operation by the switchover of the switchover valve 20. Therefore, the compressed air flows out of the air bellows 8a, 8b of the rear axle 4 with open shutoff valves 54a, 54b, 82 via the bellows lines 52a, 52b, the first axle working line 40 and the first main working line 36 counter to the delivery direction through the delivery line 30 and via the dryer 18 and the bypass line 34 and the outlet line into the environment. In this switching position, air is supplied to the air bellows 6a, 6b of the front axle 2 using compressed air from the compressed air reservoir 86, which must be correspondingly filled. To this end, the shutoff valves 48a, 48b, 76 in the bellows lines 46a, 46b and the second axle working line 72 of the front axle 2 are open so that the compressed air flows out of the compressed air reservoir 86 into the air bellows 6a, 6b of the front axle 2. In this tilting function too, the venting of the air bellows 8a, 8b of the rear axle 4 and the supply of air to the air bellows 6a, 6b of the front axle 2 take place simultaneously, resulting in rapid tilting of the vehicle body to the rear about the transverse axis of the vehicle. However, this tilting function is less energy-saving, since the compressed air escapes from the air bellows 8a, 8b of the rear axle 4 into the environment.

Figure 3:
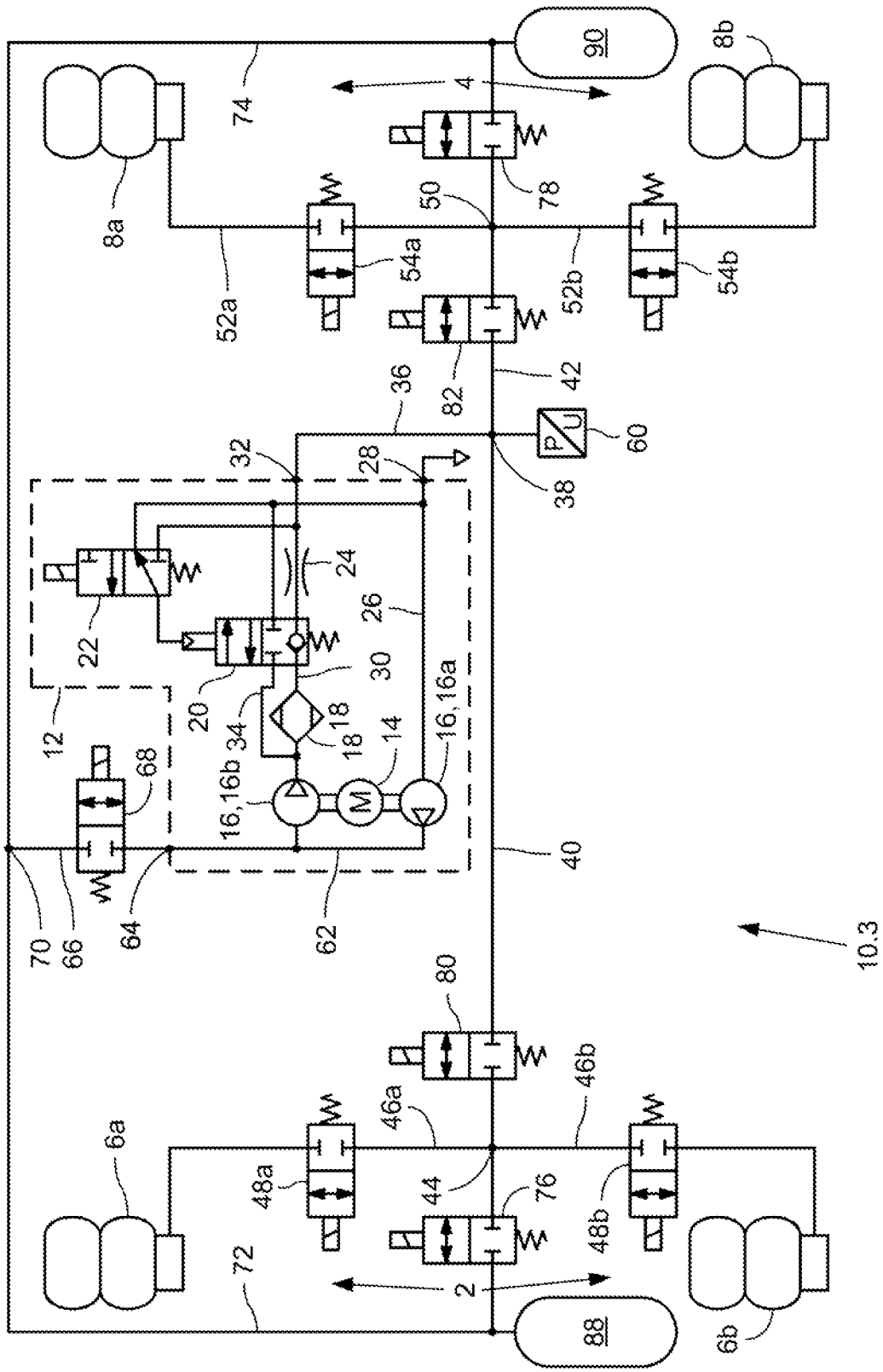
FIG. 3 shows an alternative embodiment of the valve arrangement according to FIG. 1 in a schematic diagram.

The schematic diagram of FIG. 3 shows an alternative embodiment, labeled 10.3, of the valve arrangement 10.1 according to the disclosure of an air suspension system of a two-axle vehicle according to FIG. 1, in which, in comparison with the described valve arrangement 10.2 according to FIG. 2, instead of the larger, largely centrally arranged compressed air reservoir 86, there are now two smaller compressed air reservoirs 88, 90, which are connected to the respective second axle working line 72, 74 close to the vehicle axles 2, 4.

Figure 3A:
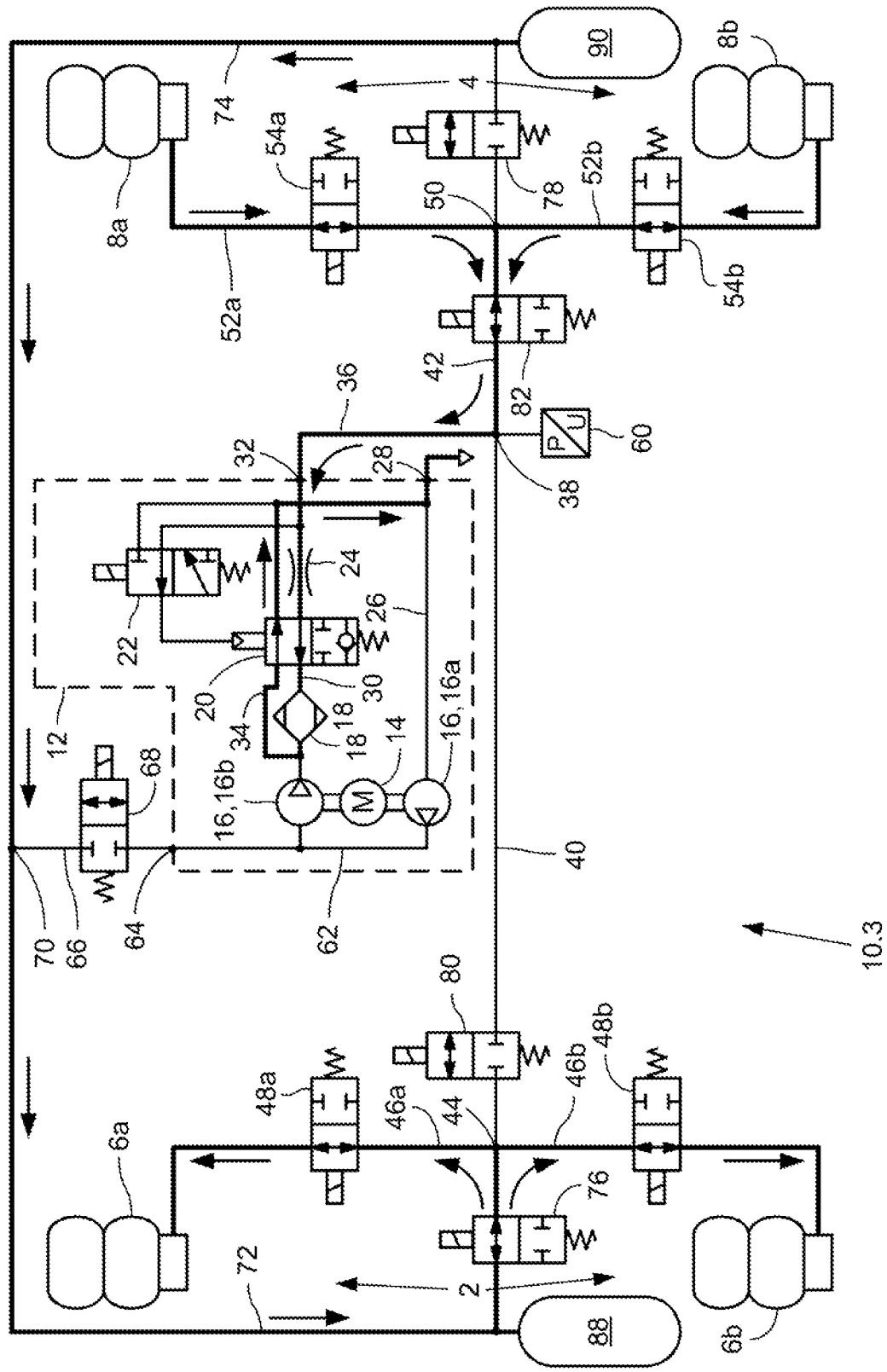
FIG. 3A shows a functional circuit of the valve arrangement according to FIG. 3 for a tilting function of the air suspension system in a schematic diagram; and, FIG. 4 shows a known valve arrangement of an air suspension system of a vehicle in a schematic diagram.

FIG. 3A illustrates a functional circuit of the valve arrangement 10.3 according to FIG. 3 for a tilting function in which the vehicle body is tilted to the rear about a transverse axis of the vehicle and lowered by venting the air bellows 8a, 8b of the rear axle 4 and supplying air to the bellows 6a, 6b of the front axle 2. To this end, the switched valves are shown shifted according to their switching state, the lines through which compressed air flows are shown with a thicker line, and the flow direction of the compressed air is indicated with direction arrows, as before.

In this switching position of the valve arrangement 10.3, the switching of the compressor 16 and of the valves 20, 22, 48a, 48b, 54a, 54b, 76, 82 corresponds to that of the tilting function described above with reference to FIG. 2A. However, air is now supplied to the air bellows 6a, 6b of the front axle 2 from both compressed air reservoirs 88, 90. To this end, the shutoff valves 48a, 48b, 76 in the bellows lines 46a, 46b and the second axle working line 72 of the front axle 2 are open so that the compressed air flows out of both compressed air reservoirs 88, 90 via the second axle working lines 72, 74 and the front bellows lines 46a, 46b into the air bellows 6a, 6b of the front axle 2.

Further switching functions of the valve arrangements 10.1, 10.2, 10.3 according to the disclosure emerge in a self-explanatory way from the schematic diagrams of FIGS. 1 to 3.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

2 Vehicle axle, front axle
4 Vehicle axle, rear axle
6a, 6b Air bellows at front axle
8a, 8b Air bellows at rear axle
10 Valve arrangement (prior art)
10.1 Valve arrangement (first embodiment)
10.2 Valve arrangement (second embodiment)
10.3 Valve arrangement (third embodiment)

12 Pressure generation unit
14 Electric motor
16 Compressor
16a First compressor stage of compressor
16b Second compressor stage of compressor
18 Air dryer
20 Switchover valve, 4/2-way switching valve
22 Pilot valve, 3/2-way magnetic switching valve
24 Throttle valve
26 Outlet line
28 Environment connection
30 Delivery line
32 Working connection
34 Bypass line
36 Main working line
38 First branching point
40 First axle working line
42 Second axle working line
44 Second branching point
46a, 46b Front bellows lines
48a, 48b Shutoff valves, 2/2-way magnetic switching valves
50 Third branching point
52a, 52b Rear bellows lines
54a, 54b Shutoff valves, 2/2-way magnetic switching valves
56 Connection line
58 Compressed air reservoir (first variant)
60 Pressure sensor
62 Delivery line
64 Second working connection
66 Second main working line
68 Shutoff valve, 2/2-way magnetic switching valve
70 Fourth branching point
72 Second axle working line
74 Second axle working line
76 Shutoff valve, 2/2-way magnetic switching valve
78 Shutoff valve, 2/2-way magnetic switching valve
80 Shutoff valve, 2/2-way magnetic switching valve
82 Shutoff valve, 2/2-way magnetic switching valve
84 Shutoff valve, 2/2-way magnetic switching valve
86 Compressed air reservoir (second variant)
88 First compressed air reservoir (third variant)
90 Second compressed air reservoir (third variant)

The invention claimed is:

1. A valve arrangement of an air suspension system of a vehicle having vehicle axles, the valve arrangement comprising:
a pressure generator having a two-stage compressor, an air dryer, a switchover valve for switching between a delivery operation and a regeneration operation;
said compressor being configured to be driven by an electric motor;
said pressure generator further having a working connection and an environment connection;
a first main working line connected to said working connection of said pressure generator and branching into at least two first axle working lines;
two bellows lines per vehicle axle, which each branch off from one of the at least two first axle working lines and lead via a first shutoff valve to an associated air bellows of a corresponding vehicle axle;
said pressure generator having a second working connection connected to a delivery line of said pressure generator between two compressor stages of said compressor;
a second main working line connected to said second working connection of said pressure generator;
a second shutoff valve arranged in said second main working line;
said second main working line branching into at least two second axle working lines downstream of said second shutoff valve;
each of said at least two second axle working lines being connected to one of at least two branching points of said at least two first axle working lines at the vehicle axles via a corresponding third shutoff valve;
each of said at least two first axle working lines having a fourth shutoff valve arranged therein; and,
said second shutoff valve, said third shutoff valves, and said fourth shutoff valves being 2/2-way magnetic switching valves configured to be closed when in a non-energized state.

2. The valve arrangement of claim 1 further comprising a compressed air reservoir connected to said first main working line or one of said at least two first axle working lines via a fifth shutoff valve; and, said fifth shutoff valve is a 2/2-way magnetic switching valve configured to be closed when in a non-energized state.

3. The valve arrangement of claim 1 further comprising a compressed air reservoir connected to the second main working line or one of said at least two second axle working lines.

4. The valve arrangement of claim 1 further comprising a first compressed air reservoir connected to a first of said at least two second axle working lines close to the corresponding vehicle axle and a second compressed air reservoir connected to a second of said at least two second axle working lines close to the corresponding vehicle axle.

5. A method for controlling an air suspension system of a vehicle having a valve arrangement, the valve arrangement including: a pressure generator having a two-stage compressor, an air dryer, a switchover valve for switching between a delivery operation and a regeneration operation; said compressor being configured to be driven by an electric motor; said pressure generator further having a working connection and an environment connection; a first main working line connected to said working connection of said pressure generator and branching into at least two first axle working lines; two bellows lines per vehicle axle, which each branch off from one of the at least two first axle working lines and lead via a first shutoff valve to an associated air bellows of a corresponding vehicle axle; said pressure generator having a second working connection connected to a delivery line of said pressure generator between two compressor stages of said compressor; a second main working line connected to said second working connection of said pressure generator; a second shutoff valve arranged in said second main working line; said second main working line branching into at least two second axle working lines downstream of said second shutoff valve; each of said at least two second axle working lines being connected to one of at least two branching points of said at least two first axle working lines at the vehicle axles via a corresponding third shutoff valve; each of said at least two first axle working lines having a fourth shutoff valve arranged therein; said second shutoff valve, said third shutoff valves, and said fourth shutoff valves being 2/2-way magnetic switching valves configured to be closed when in a non-energized state; the method, in order to tilt a vehicle body rapidly about a transverse axis of the vehicle, comprising simultaneously:
switching on the compressor and opening the second shutoff valve arranged in the second main working line;

opening the first and the third shutoff valves arranged in the at least two second axle working lines and in the two bellows lines at the vehicle axle at which the vehicle body is to be lowered; and, opening the first and the fourth shutoff valves that are arranged in a first of said at least two first axle working lines and in the two bellows lines at the vehicle axle at which the vehicle body is to be raised.

6. The method of claim 5, wherein the method, for charging a compressed air reservoir when the first, second, third, and fourth shutoff valves are closed, further comprises:

switching on the compressor and opening a further shutoff valve associated with the compressed air reservoir;

monitoring a filling pressure of the compressed air reservoir via a pressure sensor connected to the first main working line or one of the first axle working lines; and, switching off the compressor and closing the further shutoff valve associated with the compressed air reservoir when an intended filling pressure of the compressed air reservoir is reached.

7. The method of claim 5, wherein the method, to regenerate the air dryer using compressed air from a compressed air reservoir when the first, second, third, and fourth shutoff valves are closed, further comprises:

switching over the switchover valve and opening a further shutoff valve associated with the compressed air reservoir;

monitoring a regeneration duration of the air dryer via a clock or a filling pressure of the compressed air reservoir via the further shutoff valve; and, switching back the switchover valve and closing the further shutoff valve of the compressed air reservoir when an intended regeneration duration or an intended filling pressure of the compressed air reservoir is reached.

8. The method of claim 5, wherein the method, to raise the vehicle body at least at one vehicle axle using compressed air from a compressed air reservoir, further comprises:

opening a further shutoff valve associated with the compressed air reservoir;

opening the first and fourth shutoff valves at the relevant vehicle axle;

monitoring a wheelbase or ground clearance of the vehicle body at a relevant vehicle axle via a height sensor; and, closing the first, fourth, and further shutoff valves when an intended wheelbase or ground clearance of the vehicle body at the relevant vehicle axle is reached.

9. A method for controlling an air suspension system of a vehicle having a vehicle body and a valve arrangement, the valve arrangement including: a pressure generator having a two-stage compressor, an air dryer, a switchover valve for switching between a delivery operation and a regeneration operation; said compressor being configured to be driven by an electric motor; said pressure generator further having a working connection and an environment connection; a first main working line connected to said working connection of said pressure generator and branching into at least two first axle working lines; two bellows lines per vehicle axle, which each branch off from one of the at least two first axle working lines and lead via a first shutoff valve to an associated air bellows of a corresponding vehicle axle; said pressure generator having a second working connection connected to a delivery line of said pressure generator between two compressor stages of said compressor; a second main working line connected to said second working connection of said pressure generator; a second shutoff valve arranged in said second main working line; said second main working line branching into at least two second axle working lines downstream of said second shutoff valve; each of said at least two second axle working lines being connected to one of at least two branching points of said at least two first axle working lines at the vehicle axles via a corresponding third shutoff valve; each of said at least two first axle working lines having a fourth shutoff valve arranged therein; said second shutoff valve, said third shutoff valves, and said fourth shutoff valves being 2/2-way magnetic switching valves configured to be closed when in a non-energized state; a compressed air reservoir connected to the second main working line or one of said at least two second axle working lines; and, wherein, in order to tilt the vehicle body rapidly about a transverse axis of the vehicle, the method comprises simultaneously:

switching over the switchover valve into a regeneration switching position;

opening the first and fourth shutoff valves at the vehicle axle at which the vehicle body is to be lowered; and, opening the first and the third shutoff valves at the vehicle axle at which the vehicle body is to be raised.

10. The method of claim 9, wherein the method, to charge the compressed air reservoir when the first and second shutoff valves are closed, further comprises:

switching on the compressor and opening the third and fourth shutoff valves of the first axle working line and of the second axle working line at least at one of the vehicle axles;

monitoring a filling pressure of the compressed air reservoir via a pressure sensor connected to the first main working line or one of the first axle working lines; and, switching off the compressor and closing the third and fourth shutoff valves when an intended filling pressure of the compressed air reservoir is reached.

11. The method of claim 10, wherein the method, to regenerate the air dryer using compressed air from the compressed air reservoir when the first and second shutoff valves are closed, further comprises:

switching over the switchover valve and opening the third and fourth shutoff valves at least at one of the vehicle axles;

monitoring a regeneration duration of the air dryer via a clock or a filling pressure of the compressed air reservoir via the pressure sensor; and, switching back the switchover valve and closing the third and fourth shutoff valves when an intended regeneration duration or the intended filling pressure of the compressed air reservoir is reached.

12. The method of claim 9, wherein the method, to raise the vehicle body at least at one vehicle axle using compressed air from the compressed air reservoir, further comprises:

opening the first and third shutoff valves at a relevant vehicle axle;

monitoring a wheelbase or ground clearance of the vehicle body at the relevant vehicle axle via a height sensor; and, closing the first and third shutoff valves when an intended wheelbase or ground clearance of the vehicle body at the relevant vehicle axle is reached.

* * * * *